United States Patent
Ball et al.

(10) Patent No.: US 11,328,086 B2
(45) Date of Patent: May 10, 2022

(54) PRIVACY DISCLOSURE

(71) Applicant: Microsoft Technology Licensing, LLC, Redmond, WA (US)

(72) Inventors: Steven Ball, Redmond, WA (US); Benjamin R. Vincent, Kirkland (GB); Jeffrey Thomas Sakowicz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 489 days.

(21) Appl. No.: 16/123,642

(22) Filed: Sep. 6, 2018

(65) Prior Publication Data

US 2020/0082115 A1    Mar. 12, 2020

(51) Int. Cl.
| | |
|---|---|
| *G06F 21/00* | (2013.01) |
| *G06F 21/62* | (2013.01) |
| *H04L 29/06* | (2006.01) |
| *G06F 40/103* | (2020.01) |

(52) U.S. Cl.
CPC ........ *G06F 21/6245* (2013.01); *G06F 40/103* (2020.01); *H04L 63/20* (2013.01)

(58) Field of Classification Search
CPC ... G06F 21/6245; G06F 40/103; H04L 63/20; H04L 63/0407
See application file for complete search history.

(56) References Cited

U.S. PATENT DOCUMENTS

| | | | | |
|---|---|---|---|---|
| 6,675,353 | B1 * | 1/2004 | Friedman | G06F 40/166 715/239 |
| 7,031,961 | B2 * | 4/2006 | Pitkow | G06F 16/9562 |
| 7,134,072 | B1 * | 11/2006 | Lovett | G06F 40/143 715/234 |
| 7,512,889 | B2 * | 3/2009 | Newell | G06F 1/163 706/45 |
| 8,166,406 | B1 * | 4/2012 | Goldfeder | H04L 63/102 715/745 |
| 10,169,607 | B1 * | 1/2019 | Sheth | G06Q 10/10 |
| 10,951,656 | B2 * | 3/2021 | Xu | H04L 63/062 |
| 2002/0188572 | A1 * | 12/2002 | Bleizeffer | G06F 21/6218 705/64 |
| 2004/0199782 | A1 * | 10/2004 | Arnold | H04L 63/0407 726/27 |
| 2005/0091101 | A1 * | 4/2005 | Epling | G06Q 30/06 705/325 |
| 2005/0209903 | A1 * | 9/2005 | Hunter | G06Q 10/10 705/7.26 |
| 2006/0041590 | A1 * | 2/2006 | King | H04N 1/00374 |
| 2006/0053377 | A1 * | 3/2006 | Newell | G06F 3/016 715/744 |
| 2007/0106754 | A1 * | 5/2007 | Moore | G06F 21/604 709/217 |

(Continued)

OTHER PUBLICATIONS

NPL Search (Google Scholar) (Year: 2021).*

*Primary Examiner* — John B King
(74) *Attorney, Agent, or Firm* — Dicke, Billig & Czaja, PLLC

(57) ABSTRACT

User privacy information related to an application or service handling of user privacy is received by a computer device. A formatted declaration based on the user privacy information is populated by the computer device. Privacy disclosure to the user based on the populated formatted declaration is provided by the computer device.

15 Claims, 3 Drawing Sheets

(56) References Cited

U.S. PATENT DOCUMENTS

| | | | |
|---|---|---|---|
| 2008/0134139 A1* | 6/2008 | Krouse | G06F 40/154 717/105 |
| 2009/0165103 A1* | 6/2009 | Cho | G06F 21/6218 726/6 |
| 2009/0320090 A1* | 12/2009 | Hungerford | G06F 16/958 726/1 |
| 2009/0320091 A1* | 12/2009 | Torres | G06F 21/6218 726/1 |
| 2009/0326982 A1* | 12/2009 | Deobhakta | G06Q 10/10 705/3 |
| 2009/0327297 A1* | 12/2009 | Deobhakta | G16H 10/60 |
| 2012/0240050 A1* | 9/2012 | Goldfeder | G06F 21/6263 715/745 |
| 2012/0297441 A1* | 11/2012 | Boldyrev | G06F 21/6245 726/1 |
| 2013/0081105 A1* | 3/2013 | Giambiagi | G06F 21/31 726/1 |
| 2013/0096938 A1* | 4/2013 | Stueckemann | G16H 15/00 705/2 |
| 2013/0179990 A1* | 7/2013 | Kritt | G06Q 50/01 726/28 |
| 2014/0119540 A1* | 5/2014 | Pearson | H04L 9/0825 380/44 |
| 2014/0229596 A1* | 8/2014 | Burke | H04L 47/805 709/223 |
| 2015/0012289 A1* | 1/2015 | Ben | G16H 10/60 705/2 |
| 2015/0089620 A1* | 3/2015 | Manza | H04L 63/0815 726/8 |
| 2015/0127829 A1* | 5/2015 | Biswas | H04L 63/20 709/225 |
| 2015/0278474 A1* | 10/2015 | Stueckemann | G06Q 10/10 705/2 |
| 2015/0286790 A1* | 10/2015 | Ahmad | G16H 10/60 705/2 |
| 2016/0330219 A1* | 11/2016 | Hasan | H04L 63/1408 |
| 2018/0046753 A1* | 2/2018 | Shelton | G16H 50/70 |
| 2018/0157748 A1* | 6/2018 | Privitera | G16H 70/60 |
| 2019/0018978 A1* | 1/2019 | Soylu | G06F 21/6245 |
| 2019/0362069 A1* | 11/2019 | Park | G06F 16/904 |
| 2020/0019713 A1* | 1/2020 | Varga | G06F 9/542 |
| 2020/0202270 A1* | 6/2020 | Brannon | G06Q 10/067 |
| 2022/0014547 A1* | 1/2022 | Hasan | G06N 5/025 |

\* cited by examiner

PRIVACY DISCLOSURE

BACKGROUND

Today, application and services developed by application developers typically provide privacy information and processes in their terms of use and privacy policy. In one example scenario, a server communicates with the application or service and a user client. The server can typically provide the user client a Uniform Resource Locator (URL) pointing to the terms of use of the application or service and the privacy policy of the application or service.

Today, there are many privacy regulations in the world (e.g., the European Union (EU) and United Kingdom (UK) General Data Privacy Regulation (GDPR); the United States (US) Children's Online Privacy Protection Act (COPPA); and the South Korea Personal Information Protection Act (PIPA).

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

GDPR (one of the many privacy regulations in the world today) defines responsibilities, accountability, and processes. GDPR provides strict definitions and obligations for Data Controllers and Data Processors. Data Controllers are primarily accountable for meeting the GDPR regulatory requirements and can be ultimately liable if the user's data is mishandled resulting in potential massive financial impact for non-compliance. In light of these many worldwide privacy regulations and their strict definitions and obligations, today's typical scenario described above where a server (communicating with an application or service and a user client) can provide the user client a URL pointing to the terms of user of the application or service and the privacy policy of the application or service, does not provide the user client sufficient privacy disclosure.

User privacy information related to an application or service handling of user privacy is received by a computer device. A formatted declaration based on the user privacy information is populated by the computer device. Privacy disclosure to the user based on the populated formatted declaration is provided by the computer device, which can provide the user client sufficient privacy disclosure to facilitate compliance with these many worldwide privacy regulations.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
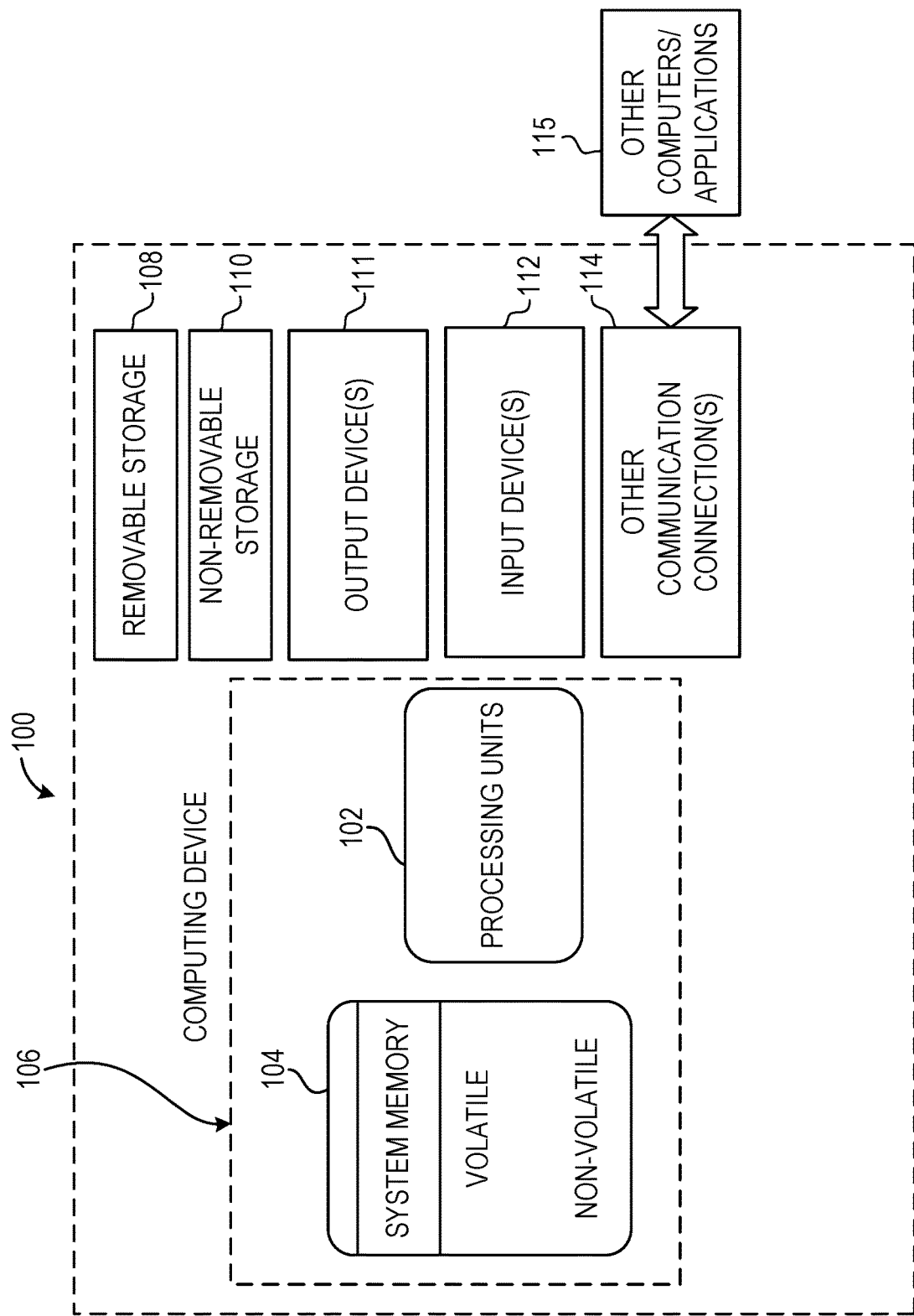
FIG. 1 is a block diagram illustrating an example of a computing device, which can be configured in a computer network.

FIG. 1 illustrates an exemplary computer system that can be employed in an operating environment and used to host or run a computer application included on one or more computer readable storage mediums storing computer executable instructions for controlling the computer system, such as a computing device, to perform a process.

The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, or other network.

Figure 2:
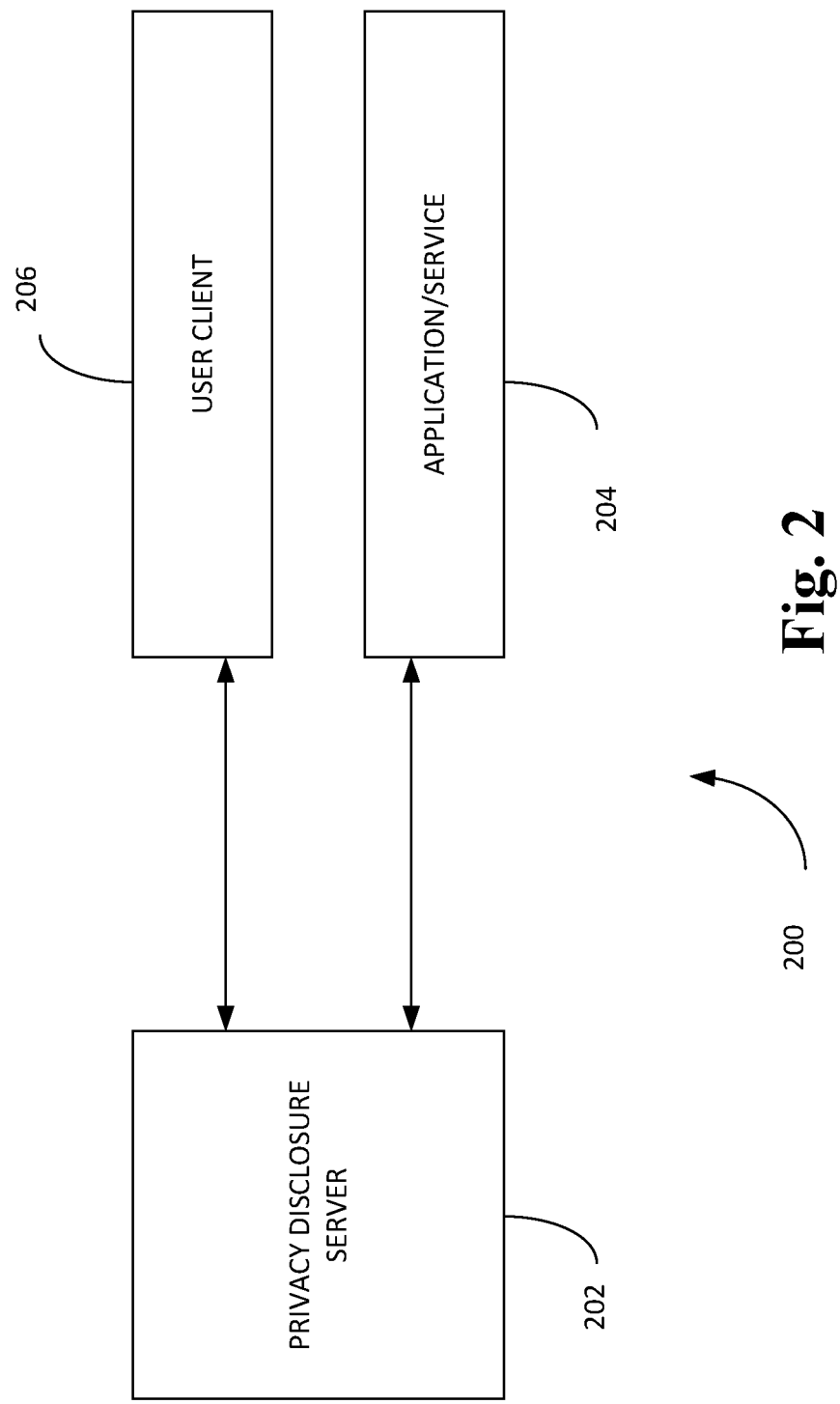
FIG. 2 is a block diagram illustrating an example computer network.

FIG. 2 illustrates an example computer network 200. Computer network 200 includes privacy disclosure server 202. Privacy disclosure server 202 can include a computing device having a processor and memory, and may be configured from a network of processor cores, computing devices, servers, virtual machines, or other processing systems. Privacy disclosure server 202 communicates with an application/service 204 (i.e., an application and/or service). Privacy disclosure server 202 also communicates with a user client 206.

Privacy disclosure server 202 receives user privacy information related to application/service 204 handling of user privacy. Privacy disclosure server 202 populates a formatted declaration based on the user privacy information. Privacy disclosure server 202 provides privacy disclosure to user client 206 based on the populated formatted declaration. In one example, the formatted declaration is a standardized formatted declaration.

The user privacy information related to application/service 204 handling of user privacy can be based on a storage policy of application/service 204. The storage policy can include an expiration policy of user data controlled by application/service 204. The storage policy can include an encryption standard used to encrypt user data.

The user privacy information related to application/service 204 handling of user privacy can be based on a sharing policy of application/service 204. The user privacy information related to application/service 204 handling of user privacy can be based on an export policy of application/service 204. The user privacy information related to application/service 204 handling of user privacy can be based on a breach policy of application/service 204.

The user privacy information related to application/service 204 handling of user privacy can be based on a verification mechanism used by application/service 204.

The user privacy information related to application/service 204 handling of user privacy can be based on terms of use of application/service 204. The user privacy information related to application/service 204 handling of user privacy can be based on a privacy policy of application/service 204.

Figure 3:
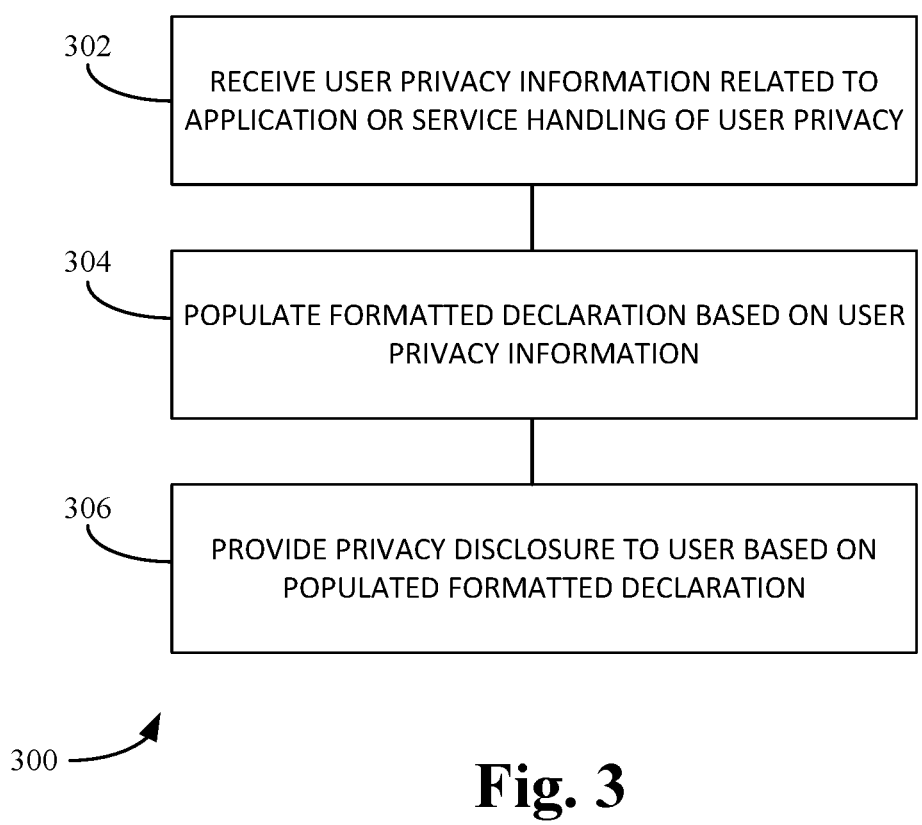
FIG. 3 is a flow diagram illustrating an example computer device implemented method of providing privacy disclosure to a user.

FIG. 3 illustrates an example an example computer device implemented method 300 of providing privacy disclosure to a user (e.g., user client 206). At 302, user privacy information related to an application or service (e.g., application/service 204) handling of user privacy is received by the computer device (e.g., privacy disclosure server 202).

The user privacy information related to the application or service handling of user privacy can be based on a storage policy of the application or service. The storage policy can include an expiration policy of user data controlled by the application or service. The storage policy can include an encryption standard used to encrypt user data. For example, the encryption standard can be AES or other suitable encryption standard. Advanced Encryption Standard (AES) is a specification for the encryption of electronic data established by the U.S. National Institute of Standards and Technology (NIST).

The user privacy information related to the application or service handling of user privacy can be based on a sharing policy of the application or service.

The user privacy information related to the application or service handling of user privacy can be based on an export policy of the application or service.

The user privacy information related to the application or service handling of user privacy can be based on a breach policy of the application or service.

The user privacy information related to the application or service handling of user privacy can be based on a verification mechanism used by the application or service. For example, the verification mechanism can be EV-CERT or other suitable verification mechanism. An Extended Validation Certificate (EV-CERT) is a certificate used for websites and software that proves the legal entity controlling the website or software package. Obtaining an EV certificate requires verification of the requesting entity's identity by a certificate authority.

The user privacy information related to the application or service handling of user privacy can be based on terms of use of the application or service.

The user privacy information related to the application or service handling of user privacy can be based on a privacy policy of the application or service.

At 304, a formatted declaration based on the user privacy information is populated by the computer device (e.g., privacy disclosure server 202). In one example, the formatted declaration is a standardized formatted declaration, such as XML or JSON.

Extensible Markup Language (XML) is a markup language that defines a set of rules for encoding documents in a format that is both human-readable and machine-readable. The W3C's XML 1.0 Specification and several other related Specifications define XML.

JavaScript Object Notation (JSON) is a lightweight data-interchange format that is human readable and machine-readable and easy for machines to parse and generate. JSON is based on a subset of the JavaScript Programming Language, but today many programming languages include code to generate and parse JSON-format data. JSON is a text format that is language independent but uses conventions that are familiar to programmers of the C-family of languages, including C, C++, C#, Java, JavaScript, Perl, Python, and many others.

At 306, privacy disclosure to the user (e.g., user client 206) based on the populated formatted declaration is provided by the computer device (e.g., privacy disclosure server 202).

An example privacy declaration for an example application developer "ABC AppDev" can be implemented as follows:

```
<PrivacyDeclaration>
    <PublishInformation
        LegalName="ABC AppDev"
        Domain="www.abc.app.dev"
        ContactDetails="support@abc.app.dev"
        VerificationMechanism="EV-CERT"
    />
    <StoragePolicy>
        ExpirationPolicy="90 days"
        EncryptionStandard="AES"
    />
    <SharingPolicy>
        WeShareYourDataWith="No One"
    />
    <ExportPolicy
        ExportProcess="website"
        ExportURL=https://support.abc.app.dev
    />
    <BreachPolicy
        BreachProcess="blog post"
        BreachURL=https://support.abc.app.dev
    />
    <LegalInformation
        TermsOfUse=https://www.abc.app.dev/tou
        PrivacyPolicy=https://www.abc.app.dev/privacy
</PrivacyDeclaration>
```

A portion of an example privacy disclosure provided by the computing device (e.g., privacy disclosure server 202 for the example application developer "ABC AppDev") to the user (e.g., user client 206) based on the populated formatted declaration is as follows:

Verification Mechanism is EV-CERT;

Encrypts user data at rest using AES;

Will automatically delete all user personal data in the application's or service's control if user revokes access;

Will automatically delete all telemetry after 30 days;

Shares user data with No One;

Allows user to export user data at http://abc.app.dev/privacy;

Allows parents to manage their child's data at http://abc.app.dev/privacy;

Will notify you by email if application or service experiences a breach;

Terms of Use is found at https://www.abc.app.dev/tou; and

Privacy Policy is found at http://www.abc.app.dev/privacy.

This privacy disclosure provided by the computing device (e.g., privacy disclosure server 202) to the user based on the populated formatted declaration can provide the user client sufficient and clear privacy disclosure that is not buried in the terms of use of the application or service or the privacy policy of the application or service. Furthermore, this privacy disclosure provided by the computing device (e.g., privacy disclosure server 202) to the user based on the populated formatted declaration can provide the user client sufficient and clear privacy disclosure which can facilitate compliance with the many worldwide privacy regulations.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A computer device implemented method of providing privacy disclosure to a user, the method comprising:

receiving, with a privacy disclosure server, user privacy information related to an application or service handling of user privacy, the user privacy information related to the application or service handling of user privacy is based on a storage policy of the application or service, the storage policy includes at least one of an expiration policy of user data controlled by the application or service, and an encryption standard used to encrypt user data;

populating, with the privacy disclosure server, a formatted declaration based on the user privacy information to form a populated formatted declaration; and providing privacy disclosure from the privacy disclosure server to the user based on the populated formatted declaration to facilitate compliance with privacy regulations.

2. The method of claim 1 wherein the user privacy information related to the application or service handling of user privacy is based on a sharing policy of the application or service.

3. The method of claim 1 wherein the user privacy information related to the application or service handling of user privacy is based on an export policy of the application or service.

4. The method of claim 1 wherein the user privacy information related to the application or service handling of user privacy is based on a breach policy of the application or service.

5. The method of claim 1 wherein the user privacy information related to the application or service handling of user privacy is based on terms of use of the application or service.

6. The method of claim 1 wherein the user privacy information related to the application or service handling of user privacy is based on a privacy policy of the application or service.

7. The method of claim 1 wherein the user privacy information related to the application or service handling of user privacy is based on a verification mechanism used by the application or service.

8. The method of claim 1 wherein the formatted declaration is a standardized formatted declaration.

9. A computer readable storage device to store computer executable instructions to control a processor to:

receive, with a privacy disclosure server, user privacy information related to an application or service handling of user privacy, the user privacy information related to the application or service handling of user privacy is based on a storage policy of the application or service, the storage policy includes at least one of an expiration policy of user data controlled by the application or service, and an encryption standard used to encrypt user data;

populate, with the privacy disclosure server, a formatted declaration based on the user privacy information to form a populated formatted declaration; and provide privacy disclosure from the privacy disclosure server to the user based on the populated formatted declaration to facilitate compliance with privacy regulations.

10. The computer readable storage device of claim 9, wherein the user privacy information related to the application or service handling of user privacy is based on at least one of; a sharing policy of the application or service; an export policy of the application or service; a breach policy of the application or service; terms of use of the application or service; and a privacy policy of the application or service.

11. A privacy disclosure server, comprising:
a memory device to store a set of instructions; and
a processor to execute the set of instructions to:
receive user privacy information related to an application or service handling of user privacy, the user privacy information related to the application or service handling of user privacy is based on a storage policy of the application or service, the storage policy includes at least one of an expiration policy of user data controlled by the application or service and an encryption standard used to encrypt user data;
populate a formatted declaration based on the user privacy information to form a populated formatted declaration;
provide privacy disclosure from the privacy disclosure server to the user based on the populated formatted declaration; and
facilitate compliance with privacy regulations.

12. The system of claim 11 wherein the user privacy information related to the application or service handling of user privacy is based on a sharing policy of the application or service.

13. The system of claim 11 wherein the user privacy information related to the application or service handling of user privacy is based on an export policy of the application or service.

14. The system of claim 11 wherein the user privacy information related to the application or service handling of user privacy is based on a breach policy of the application or service.

15. The system of claim 11 wherein the user privacy information related to the application or service handling of user privacy is based on at least one of terms of use of the application or service and a privacy policy of the application or service.

* * * * *